United States Patent
Shor et al.

(10) Patent No.: US 11,996,116 B2
(45) Date of Patent: May 28, 2024

(54) METHODS AND SYSTEMS FOR IMPLEMENTING ON-DEVICE NON-SEMANTIC REPRESENTATION FINE-TUNING FOR SPEECH CLASSIFICATION

(71) Applicant: Google LLC, Mountain View, CA (US)

(72) Inventors: Joel Shor, Mountain View, CA (US); Ronnie Maor, Mountain View, CA (US); Oran Lang, Mountain View, CA (US); Omry Tuval, Mountain View, CA (US); Marco Tagliasacchi, Mountain View, CA (US); Ira Shavitt, Mountain View, CA (US); Felix de Chaumont Quitry, Mountain View, CA (US); Dotan Emanuel, Mountain View, CA (US); Aren Jansen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 531 days.

(21) Appl. No.: 17/000,583

(22) Filed: Aug. 24, 2020

(65) Prior Publication Data
US 2022/0059117 A1 Feb. 24, 2022

(51) Int. Cl.
*G10L 25/30* (2013.01)
*G06F 18/21* (2023.01)
(Continued)

(52) U.S. Cl.
CPC ............ *G10L 25/30* (2013.01); *G06F 18/217* (2023.01); *G06N 3/084* (2013.01); *G06N 3/088* (2013.01); *G06N 5/046* (2013.01); *G10L 25/48* (2013.01)

(58) Field of Classification Search
CPC ......... G10L 25/30; G10L 25/48; G10L 17/18; G10L 25/63; G10L 25/51; G06K 9/6262;
(Continued)

(56) References Cited

U.S. PATENT DOCUMENTS 10,818,384 B1 * 10/2020 Peterson ............... G06F 16/951
2002/0095295 A1 * 7/2002 Cohen .................. H04M 3/493
704/275

(Continued)

OTHER PUBLICATIONS

Gemmeke, Jort F., et al. "Audio set: An ontology and human-labeled dataset for audio events." 2017 IEEE international conference on acoustics, speech and signal processing (ICASSP). (2017) pp. 776-780 (Year: 2017).*

(Continued)

*Primary Examiner* — Jesse S Pullias
*Assistant Examiner* — Michael C. Lee
(74) *Attorney, Agent, or Firm* — McDonnell Boehnen Hulbert & Berghoff LLP

(57) ABSTRACT

Examples relate to on-device non-semantic representation fine-tuning for speech classification. A computing system may obtain audio data having a speech portion and train a neural network to learn a non-semantic speech representation based on the speech portion of the audio data. The computing system may evaluate performance of the non-semantic speech representation based on a set of benchmark tasks corresponding to a speech domain and perform a fine-tuning process on the non-semantic speech representation based on one or more downstream tasks. The computing system may further generate a model based on the non-semantic representation and provide the model to a mobile computing device. The model is configured to operate locally on the mobile computing device.

20 Claims, 10 Drawing Sheets

(51) Int. Cl.
G06N 3/084 (2023.01)
G06N 3/088 (2023.01)
G06N 5/046 (2023.01)
G10L 25/48 (2013.01)

(58) Field of Classification Search
CPC ........ G06N 3/084; G06N 3/088; G06N 5/046; G06N 3/0454
See application file for complete search history.

(56) References Cited

U.S. PATENT DOCUMENTS

| | | | | |
|---|---|---|---|---|
| 2018/0336888 | A1* | 11/2018 | Jiang | G06N 3/08 |
| 2019/0108841 | A1* | 4/2019 | Vergyri | A61B 5/749 |
| 2020/0251120 | A1* | 8/2020 | Froehlich | G10L 21/0272 |
| 2021/0005067 | A1* | 1/2021 | Salekin | G10L 15/08 |
| 2021/0005182 | A1* | 1/2021 | Han | G10L 25/24 |
| 2021/0042391 | A1* | 2/2021 | Gehrmann | G06N 3/048 |
| 2021/0110273 | A1* | 4/2021 | Kwon | G06N 99/00 |
| 2021/0117623 | A1* | 4/2021 | Aly | G06F 3/011 |
| 2021/0158126 | A1* | 5/2021 | Li | G06N 3/08 |
| 2021/0280167 | A1* | 9/2021 | Smith | G10L 13/027 |
| 2021/0374141 | A1* | 12/2021 | Zhao | G06F 16/24578 |
| 2021/0406478 | A1* | 12/2021 | Klein | G06N 3/045 |

OTHER PUBLICATIONS

Warden, Pete. "Speech commands: A dataset for limited-vocabulary speech recognition." arXiv preprint arXiv:1804.03209 (2018), pp. 1-11 (Year: 2018).*

Gazeau, Valentin, et al. "Automatic spoken language recognition with neural networks." Int. J. Inf. Technol. Comput. Sci.(IJITCS) 10.8 (2018), pp. 11-17 (Year: 2018).*

Jansen, Aren, et al. "Unsupervised learning of semantic audio representations." 2018 IEEE international conference on acoustics, speech and signal processing (ICASSP). IEEE, 2018, pp. 126-130 (Year: 2018).*

Peluso, Valentino, et al. "Performance Profiling of Embedded ConvNets under Thermal-Aware DVFS." (2019), pp. 1-13 (Year: 2019).*

Viviani, Paolo, et al. "Deep learning at scale." 2019 27th Euromicro International Conference on Parallel, Distributed and Network-Based Processing (PDP). IEEE, 2019, pp. 124-131 (Year: 2019).*

Onu, Charles C., et al. "Neural transfer learning for cry-based diagnosis of perinatal asphyxia." arXiv preprint arXiv:1906.10199v2 (Jul. 2, 2019), pp. 1-5 (Year: 2019).*

Baevski, Alexei, Steffen Schneider, and Michael Auli. "vq-wav2vec: Self-supervised learning of discrete speech representations." arXiv preprint arXiv:1910.05453 (Feb. 16, 2020), pp. 1-12 (Year: 2020).*

Baevski, Alexei, et al. "wav2vec 2.0: A Framework for Self-Supervised Learning of Speech Representations." arXiv preprint arXiv:2006.11477 (Jun. 20, 2020), pp. 1-19 (Year: 2020).*

Kong, Qiuqiang, et al. "PANNs: Large-Scale Pretrained Audio Neural Networks for Audio Pattern Recognition." arXiv preprint arXiv:1912.10211v5 (Aug. 23, 2020), pp. 1-15 (Year: 2020).*

"NVIDIA Tesla V100", available at https://web.archive.org/web/20200810164536/https://www.nvidia.com/en-gb/data-center/tesla-v100/ (retrieved on Aug. 10, 2020) (Year: 2020).*

Jaiswal, Bhavesh, et al. "Deep neural network compression via knowledge distillation for embedded applications." 2017 Nirma University International Conference on Engineering (NUiCONE). IEEE, 2017, pp. 1-4 (Year: 2017).*

Georgiev, Petko, et al. "Low-resource multi-task audio sensing for mobile and embedded devices via shared deep neural network representations." Proceedings of the ACM on Interactive, Mobile, Wearable and Ubiquitous Technologies 1.3 (2017): 1-19 (Year: 2017).*

Turc, Iulia, et al. "Well-read students learn better: On the importance of pre-training compact models." arXiv preprint arXiv:1908.08962 (Aug. 23, 2019), pp. 1-12. (Year: 2019).*

Chhabra, Saruchi, et al. "Voice identity discrimination in schizophrenia." Neuropsychologia 50.12 (2012): 2730-2735 (Year: 2012).*

Lopez-Otero, Paula, et al. "A study of acoustic features for the classification of depressed speech." 2014 37th International Convention on Information and Communication Technology, Electronics and Microelectronics (MIPRO). IEEE, 2014, pp. 1331-1335 (Year: 2014).*

Igras-Cybulska, Magdalena, et al. "Structure of pauses in speech in the context of speaker verification and classification of speech type." EURASIP Journal on Audio, Speech, and Music Processing 2016 (2016): pp. 1-16 (Year: 2016).*

Lu, Li, et al. "I sense you by breath: Speaker recognition via breath biometrics." IEEE Transactions on Dependable and Secure Computing 17.2 (2017): 306-319 (Year: 2017).*

Shor et al., "Towards Learning a Universal Non-Semantic Representation of Speech", Cornell University (2020).

* cited by examiner $$\begin{array}{|c|c|c|c|c|}
\hline
0 & 0 & 1 & 0 & 0 \\
\hline
0 & 1 & 1 & 1 & 0 \\
\hline
1 & 1 & 1 & 1 & 1 \\
\hline
1 & 1 & 0 & 0 & 1 \\
\hline
1 & 0 & 0 & 0 & 0 \\
\hline
\end{array}$$ ← 420

$*$ $$\begin{array}{|c|c|c|}
\hline
1 & 0 & 1 \\
\hline
0 & 1 & 0 \\
\hline
1 & 0 & 1 \\
\hline
\end{array}$$ ← 422

$=$ $$\begin{array}{|c|c|c|}
\hline
4 & 3 & 4 \\
\hline
3 & 4 & 3 \\
\hline
4 & 2 & 2 \\
\hline
\end{array}$$ ← 424

Figure 4B

METHODS AND SYSTEMS FOR IMPLEMENTING ON-DEVICE NON-SEMANTIC REPRESENTATION FINE-TUNING FOR SPEECH CLASSIFICATION

BACKGROUND

Machine learning algorithms can figure out how to perform important tasks by generalizing from examples, which can make machine learning often more feasible and cost-effective for applications than manual programs. Machine learning can be decomposed into three components: representation learning, evaluation, and optimization.

Representation learning involves transforming input data (or extracting features from the input data) to learn a representation for the data. Representation can be the space of allowed models that factors expressing models in some formal language. For example, a learned representation can be a composition of multiple non-linear transformations that enable a system to perform a task, such as classification, feature extraction, or prediction modeling, among others. Successful representations can improve the sample efficiency of machine learning processes by extracting more information out of raw data before any task-specific learning occurs.

Machine learning can enable a good representation to be found for a given domain. For instance, the visual domain and the language domain both have achieved progress towards good representations developed through machine learning. The speech domain, however, lacks a good representation that can universally represent the domain. One reason that the speech domain does not have a high quality representation is the lack of standard benchmark tasks that can be used to compare different methods. In addition, existing speech representations are typically developed to address a particular problem set, such as speaker recognition or speech emotion recognition. Thus, there exists a need for a set of standard benchmark tasks that could be applied to evaluate learned representations developed within the speech domain and could also be used to develop a high quality representation that can represent the speech domain overall.

SUMMARY

Disclosed herein are examples that relate to a set of standard benchmarks that can be used to evaluate learned representations on non-semantic tasks in the speech domain and techniques for learning a high quality non-semantic speech representation that can be subsequently fine-tuned and distilled into a model that can effectively work for different downstream tasks in the speech domain.

In one aspect, the present application describes a method. The method involves obtaining, by a computing system, audio data having a speech portion and training, by the computing system, a neural network to learn a non-semantic speech representation based on the speech portion of the audio data. The method also involves evaluating performance of the non-semantic speech representation based on a set of benchmark tasks corresponding to a speech domain and performing, by the computing system, a fine-tuning process on the non-semantic speech representation based on one or more downstream tasks. The method also involves generating, by the computing system, a model based on the non-semantic speech representation; and providing, by the computing system, the model to a mobile computing device. The model is configured to operate locally on the mobile computing device.

In another aspect, the present application describes a system. The system includes a mobile computing device and a computing device. The computing device is configured to obtain audio data having a speech portion, train a neural network to learn a non-semantic speech representation based on the speech portion of the audio data, and evaluate performance of the non-semantic speech representation based on a set of benchmark tasks corresponding to a speech domain. The computing device is also configured to perform a fine-tuning process on the non-semantic speech representation based on one or more downstream tasks, generate a model based on the non-semantic speech representation, and provide the model to the mobile computing device. The model is configured to operate locally on the mobile computing device.

In yet another example, the present application describes a non-transitory computer-readable medium configured to store instructions, that when executed by a computing system comprising one or more processors, causes the computing system to perform operations. The operations involve obtaining audio data having a speech portion, training a neural network to learn a non-semantic speech representation based on the speech portion of the audio data, and evaluating performance of the non-semantic speech representation based on a set of benchmark tasks corresponding to a speech domain. The operations also involve performing a fine-tuning process on the non-semantic speech representation based on one or more downstream tasks, generating a model based on the non-semantic speech representation, and providing the model to a mobile computing device. The model is configured to operate locally on the mobile computing device.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4B depicts a convolution, according to one or more example embodiments.

DETAILED DESCRIPTION

Figure 1:
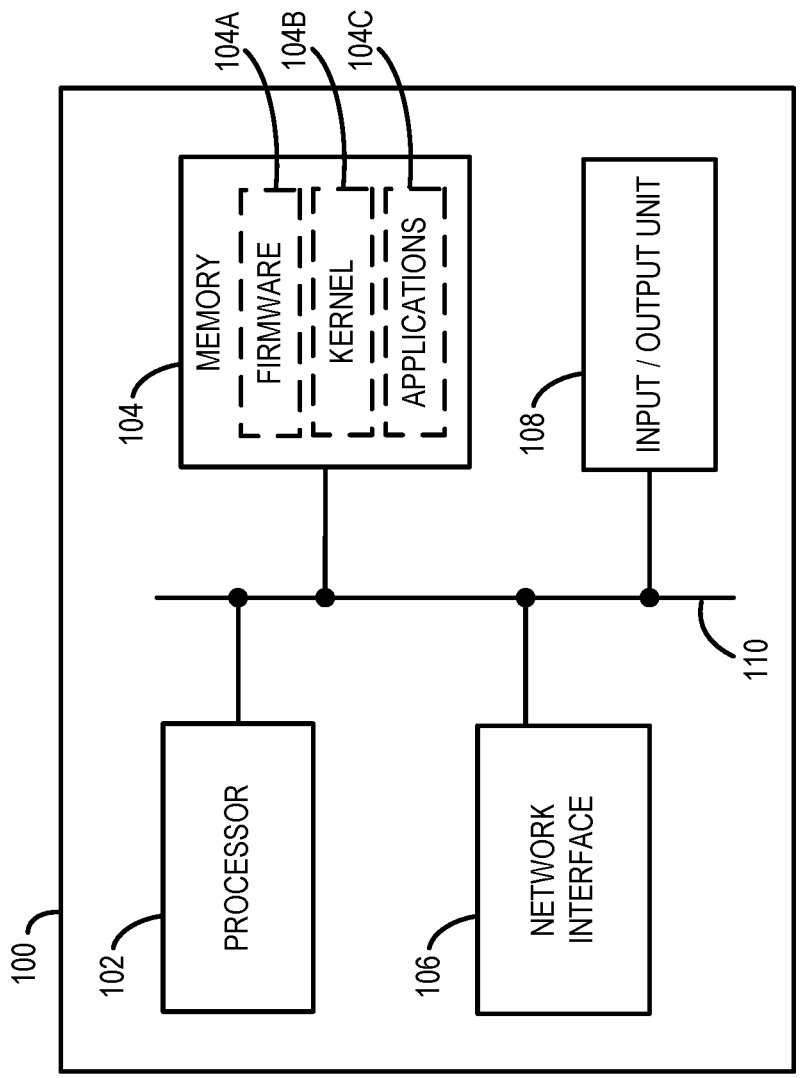
FIG. 1 illustrates a schematic drawing of a computing device, according to one or more example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Although deep learning can be used to find a good representation for a domain, the speech domain currently lacks a quality universal representation. Unlike representations determined for the visual domain and the language domain, most existing speech representations were learned based a particular problem to perform a specific task within the speech domain, such as automatic speech recognition (ASR), speaker recognition (SR), and speaker emotion recognition (SER). In addition, because the speech domain lacks a standard benchmark, the performance of different speech representations may not be easily compared.

Example embodiments presented herein relate to a set of standard benchmarks that can be used to evaluate learned representations on non-semantic tasks in the speech domain and techniques for learning a high quality non-semantic speech representation that can be subsequently fine-tuned and distilled into a model that can effectively work for different downstream tasks in the speech domain. The example methods and systems may enable the development, evaluation, and distribution of a model that can perform various speech-based tasks locally on mobile computing devices, such as smartphones, wearable computing devices, and other types of computing devices.

To overcome challenges associated with evaluating speech representations in the speech domain, a set of benchmark speech tasks described as "Non-Semantic Speech benchmark" (NOSS) is presented herein. NOSS is a benchmark that represents speech tasks that can reflect different properties of the speech signal, which can vary in size and difficulty. As such, NOSS can be used to assess the general usefulness of speech representations on non-semantic tasks, such as the application of a speech representation on one or more paralinguistic tasks. Some paralinguistic tasks include speech emotion state recognition, speaker identification, language identification, and medical diagnosis. Non-semantic tasks differ from semantic tasks like automatic speech and phone classification that require sub-second granularity. As such, a computing system may use NOSS to compare learned representations on non-semantic speech tasks.

Some embodiments involve using NOSS to evaluate a learned speech representation, such as a speech representation learned specifically to represent the speech domain in a manner similar to the representations that universally represent the visual and language domains, respectfully. To develop a high quality speech representation for non-semantic speech tasks, a computing system may initially obtain audio data that includes a speech portion (e.g., speech clips from various speakers) from local memory or from another computing device (e.g., a server). The computing system may use speech clips from the audio data to train a neural network to learn a good representation for non-semantic downstream tasks. For instance, the computing system may be configured to train a pre-trained neural network to develop the speech representation using unsupervised learning. In some embodiments, the non-semantic speech representation is a triplet loss network (TRILL) and can be learned in a self-supervised way using speech clips within audio data. The TRILL may represent and organize audio data such that segments which are closer in time are also closer in the embedding space.

The computing system or another system may evaluate the performance of the non-semantic speech representation based on NOSS. The evaluation may involve comparing the performance of the non-semantic speech representation relative to the performance of existing feature-based and learned representations for specific tasks (e.g., speaker identification, emotion recognition). For example, the computing system can compare how different embeddings (e.g., low level representations) including the non-semantic speech representation perform on speaker identification, language identification, command, emotion, emotion, and/or a health-related task. The computing system may determine that the non-semantic speech representation outperforms existing representations for some downstream tasks. In some examples, evaluation of the representations may involve training small models built on top of the representations and comparing the performances of the models.

In some examples, NOSS can further incorporate a set of intra-speaker sub-tasks developed from existing tasks associated with models trained and evaluated on a single speaker's speech. A system may use the intra-speaker tasks to measure which speech representations are useful for personalizing smartphones and other computing devices (e.g., wearable computing devices) that continue to perform more speech processing techniques locally.

The computing system may perform a fine-tuning process on the non-semantic speech representation based on one or more downstream tasks. Particularly, the evaluation of the representation's performance on downstream tasks may indicate where the representation may need improvement through fine-tuning or another process. The fine-tuning process may increase the non-semantic speech representation's performance for one or more downstream tasks. In some instances, the fine-tuning may increase performance on some downstream tasks more than others. The fine-tuning process can improve the overall performance of the non-semantic speech representation, which may enable the fine-tuned non-semantic speech representation to outperform other representations at one or more downstream tasks.

The computing system may generate a model based on the non-semantic speech representation and provide the model to one or more mobile computing devices. The model may operate locally on the mobile computing device. For example, the model may run inference and training on the mobile computing device. In some instances, the computing system may use distillation to reduce the size of the model without compromising on performance. As such, the model may enable the mobile computing device to perform operations based on vocal inputs from a user. The model may enable speaker identification, language identification, speech commands, and/or emotion to be processed in a way that enables the mobile computing device to perform certain operations. For instance, the mobile computing device may perform operations differently based on the identity or emotion of the user.

I. Example Computing Devices and Cloud-Based Computing Environments

The following embodiments describe architectural and operational aspects of example computing devices and systems that may employ machine learning and the disclosed ANN implementations, as well as the features and advantages thereof.

FIG. 1 is a simplified block diagram exemplifying computing system 100, illustrating some of the components that could be included in a computing device arranged to operate in accordance with the embodiments herein. Computing system 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing system 100 includes processor 102, memory 104, network interface 106, and an input/output unit 108, all of which may be coupled by a system bus 110 or a similar mechanism. In some embodiments, computing system 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing system 100 may include fixed memory as well as one or more removable memory units, the latter including but not limited to various types of secure digital (SD) cards. Thus, memory 104 represents both main memory units, as well as long-term storage. Other types of memory may include biological memory. Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing system 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing system 100. Applications 104C may be one or more user-space software programs, such as web browsers or email clients, as well as any software libraries used by these programs. In some examples, applications 104C may include one or more neural network applications and other deep learning-based applications. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing system 100 may include Ethernet, BLUETOOTH®, and Wifi interfaces.

Input/output unit 108 may facilitate user and peripheral device interaction with computing system 100 and/or other computing systems. Input/output unit 108 may include one or more types of input devices, such as a keyboard, a mouse, one or more touch screens, sensors, biometric sensors, and so on. Similarly, input/output unit 108 may include one or more types of output devices, such as a screen, monitor, printer, and/or one or more light emitting diodes (LEDs). Additionally or alternatively, computing system 100 may communicate with other devices using a universal serial bus (USB) or high-definition multimedia interface (HDMI) port interface, for example.

In some embodiments, one or more instances of computing system 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing system 100 may enable performance of embodiments described herein, including using neural networks and implementing non-semantic representations for speech classification.

Figure 2:
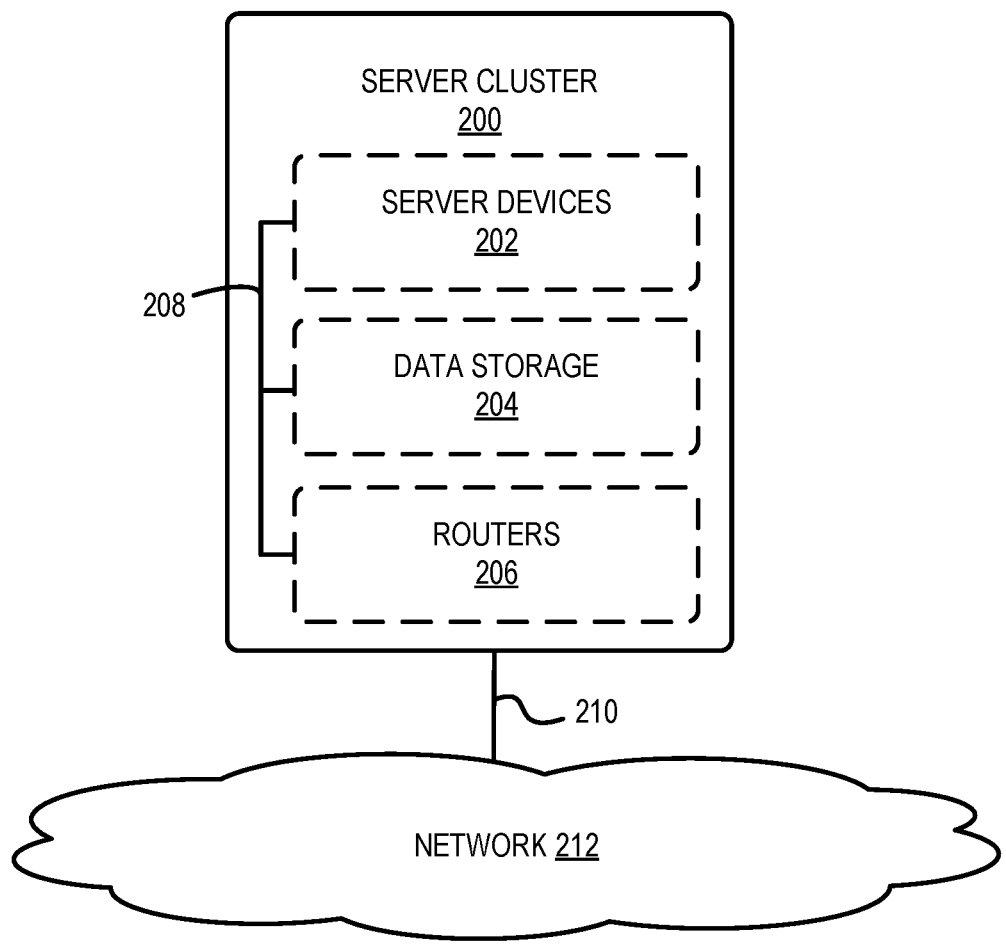
FIG. 2 illustrates a schematic drawing of a server device cluster, according to one or more example embodiments.

FIG. 2 depicts a cloud-based server cluster 200 in accordance with example embodiments. In FIG. 2, one or more operations of a computing device (e.g., computing system 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200. In some examples, server cluster 200 may perform one or more operations described herein, including the use of neural networks and implementation of non-semantic representations for speech classification.

Server devices 202 can be configured to perform various computing tasks of computing system 100. For example, one or more computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

II. Artificial Neural Network

A. Example ANN

An artificial neural network (ANN) is a computational model in which a number of simple units, working individually in parallel and without central control, can combine to solve complex problems. An ANN is represented as a number of nodes that are arranged into a number of layers, with connections between the nodes of adjacent layers.

Figure 3A:
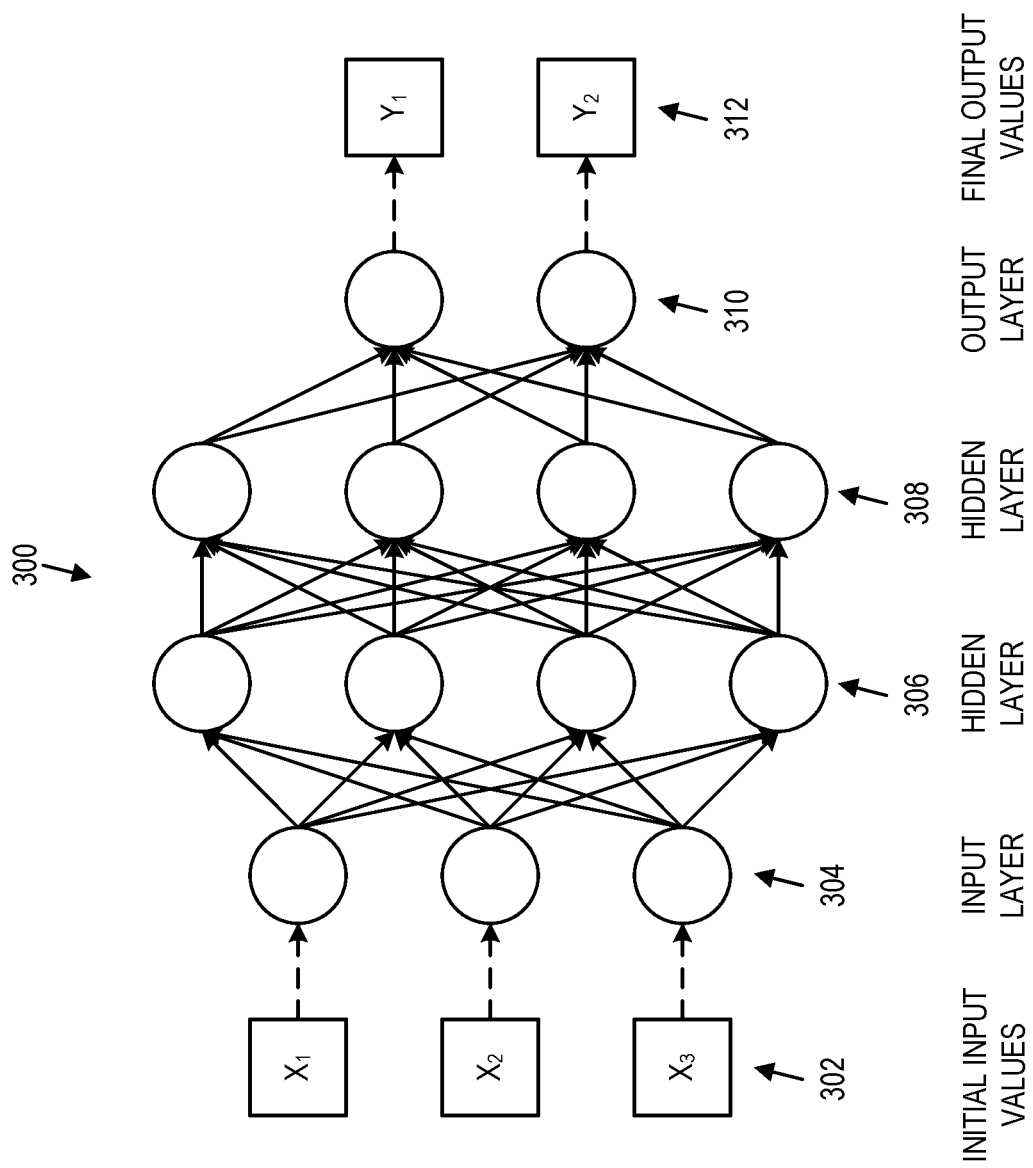
FIG. 3A depicts an artificial neural network (ANN) architecture, according to one or more example embodiments.

An example ANN 300 is shown in FIG. 3A. Particularly, ANN 300 represents a feed-forward multilayer neural network, but similar structures and principles are used in convolution neural networks (CNNs), recurrent neural networks, and recursive neural networks, for example. ANN 300 can represent an ANN trained to perform particular tasks, such as image processing techniques (e.g., segmentation, semantic segmentation, image enhancements) or learning neural light transport functions described herein. In further examples, ANN 300 can learn to perform other tasks, such as computer vision, risk evaluation, etc.

As shown in FIG. 3A, ANN 300 consists of four layers: input layer 304, hidden layer 306, hidden layer 308, and output layer 310. The three nodes of input layer 304 respectively receive $X_1$, $X_2$, and $X_3$ as initial input values 302. The two nodes of output layer 310 respectively produce $Y_1$ and $Y_2$ as final output values 312. As such, ANN 300 is a fully-connected network, in that nodes of each layer aside from input layer 304 receive input from all nodes in the previous layer.

The solid arrows between pairs of nodes represent connections through which intermediate values flow, and are each associated with a respective weight that is applied to the respective intermediate value. Each node performs an operation on its input values and their associated weights (e.g., values between 0 and 1, inclusive) to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots, w_n\}$, the dot-product sum d may be determined as:

$$d = \Sigma_{i=1}^{n} x_i w_i + b \tag{1}$$

Where b is a node-specific or layer-specific bias.

Notably, the fully-connected nature of ANN 300 can be used to effectively represent a partially-connected ANN by giving one or more weights a value of 0. Similarly, the bias can also be set to 0 to eliminate the b term.

An activation function, such as the logistic function, may be used to map d to an output value y that is between 0 and 1, inclusive:

$$y = \frac{1}{1 + e^{-d}} \tag{2}$$

Functions other than the logistic function, such as the sigmoid or tanh functions, may be used instead.

Then, y may be used on each of the node's output connections, and will be modified by the respective weights thereof. Particularly, in ANN 300, input values and weights are applied to the nodes of each layer, from left to right until final output values 312 are produced. If ANN 300 has been fully trained, final output values 312 are a proposed solution to the problem that ANN 300 has been trained to solve. In order to obtain a meaningful, useful, and reasonably accurate solution, ANN 300 requires at least some extent of training.

B. Training

Training an ANN may involve providing the ANN with some form of supervisory training data, namely sets of input values and desired, or ground truth, output values. For example, supervisory training may enable an ANN to perform non-semantic tasks, which can involve providing training datasets to determine desired representations. For ANN 300, this training data may include m sets of input values paired with output values. More formally, the training data may be represented as:

$$\{X_{1,i}, X_{2,i}, X_{3,i}, \widehat{Y_{1,i}}, \widehat{Y_{2,i}}\} \quad (3)$$

where i=1 ... m, and $\widehat{Y_{1,i}}$ and $\widehat{Y_{2,i}}$ are the desired output values for the input values of $X_{1,i}$, $X_{2,i}$, and $X_{3,i}$.

The training process involves applying the input values from such a set to ANN 300 and producing associated output values. A loss function can be used to evaluate the error between the produced output values and the ground truth output values. In some instances, this loss function may be a sum of differences, mean squared error, or some other metric. In some cases, error values are determined for all of the m sets, and the error function involves calculating an aggregate (e.g., an average) of these values.

Once the error is determined, the weights on the connections are updated in an attempt to reduce the error. In simple terms, this update process should reward "good" weights and penalize "bad" weights. Thus, the updating should distribute the "blame" for the error through ANN 300 in a fashion that results in a lower error for future iterations of the training data. For example, the update process can involve modifying at least one weight of ANN 300 such that subsequent applications of ANN 300 on training data generates new outputs that more closely match the ground truth masks that correspond to the training data.

The training process continues applying the training data to ANN 300 until the weights converge. Convergence occurs when the error is less than a threshold value or the change in the error is sufficiently small between consecutive iterations of training. At this point, ANN 300 is said to be "trained" and can be applied to new sets of input values in order to predict output values that are unknown. When trained to perform image processing techniques, ANN 300 may produce outputs of input images that closely resemble ground truths (i.e., desired results) created for the input images.

Many training techniques for ANNs make use of some form of backpropagation. During backpropagation, input signals are forward-propagated through the network the outputs, and network errors are then calculated with respect to target variables and back-propagated backwards towards the inputs. Particularly, backpropagation distributes the error one layer at a time, from right to left, through ANN 300. Thus, the weights of the connections between hidden layer 308 and output layer 310 are updated first, the weights of the connections between hidden layer 306 and hidden layer 308 are updated second, and so on. This updating is based on the derivative of the activation function.

Figure 3B:
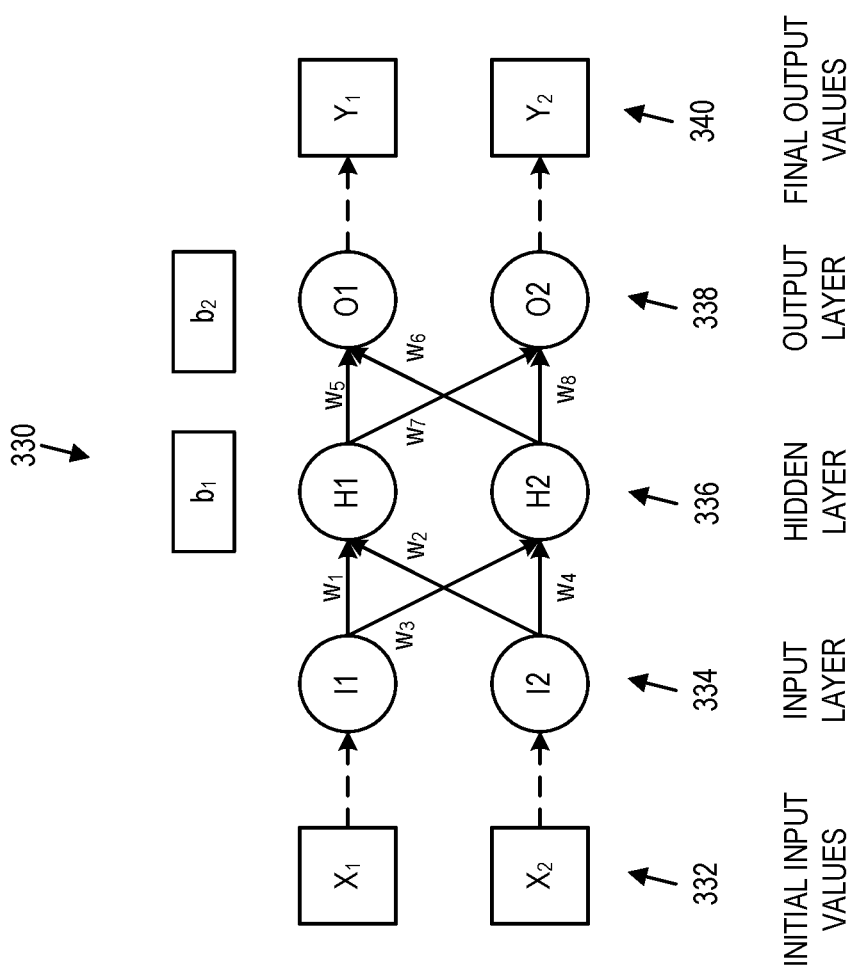
FIG. 3B depicts training the ANN, according to one or more example embodiments.

In order to further explain error determination and backpropagation, it is helpful to look at an example of the process in action. However, backpropagation can become quite complex to represent except on the simplest of ANNs. Therefore, FIG. 3B introduces a very simple ANN 330 in order to provide an illustrative example of backpropagation.

TABLE 1

| Weight | Nodes | Weight | Nodes |
|---|---|---|---|
| $w_1$ | I1, H1 | $w_5$ | H1, O1 |
| $w_2$ | I2, H1 | $w_6$ | H2, O1 |
| $w_3$ | I1, H2 | $w_7$ | H1, O2 |
| $w_4$ | I2, H2 | $w_8$ | H2, O2 |

ANN 330 consists of three layers, input layer 334, hidden layer 336, and output layer 338, each having two nodes. Initial input values 332 are provided to input layer 334, and output layer 338 produces final output values 340. Weights have been assigned to each of the connections and biases (e.g., $b_1$, $b_2$ shown in FIG. 3B) may also apply to the net input of each node in hidden layer 336 in some examples. For clarity, Table 1 maps weights to pair of nodes with connections to which these weights apply. As an example, $w_2$ is applied to the connection between nodes I2 and H1, $w_7$ is applied to the connection between nodes H1 and O2, and so on.

The goal of training ANN 330 is to update the weights over some number of feed forward and backpropagation iterations until the final output values 340 are sufficiently close to designated desired outputs. Note that use of a single set of training data effectively trains ANN 330 for just that set. If multiple sets of training data are used, ANN 330 will be trained in accordance with those sets as well.

1. Example Feed Forward Pass

To initiate the feed forward pass, net inputs to each of the nodes in hidden layer 336 are calculated. From the net inputs, the outputs of these nodes can be found by applying the activation function. For node H1, the net input $net_{H1}$ is:

$$net_{H1} = w_1 X_1 + w_2 X_2 + b_1 \quad (4)$$

Applying the activation function (here, the logistic function) to this input determines that the output of node H1, $out_{H1}$ is:

$$out_{H1} = \frac{1}{1 + e^{-net_{H1}}} \quad (5)$$

Following the same procedure for node H2, the output $out_{H2}$ can also be determined. The next step in the feed forward iteration is to perform the same calculations for the nodes of output layer 338. For example, net input to node O1, $net_{O1}$ is:

$$net_{O1} = w_5 out_{H1} + w_6 out_{H2} + b_2 \quad (6)$$

Thus, output for node O1, $out_{O1}$ is:

$$out_{O1} = \frac{1}{1 + e^{-net_{O1}}} \quad (7)$$

Following the same procedure for node O2, the output $out_{O2}$ can be determined. At this point, the total error, $\Delta$, can be determined based on a loss function. For instance, the loss function can be the sum of the squared error for the nodes in output layer 508. In other words:

$$\Delta = \Delta_{O1} + \Delta_{O2} = \frac{1}{2}(out_{O1} - \hat{Y}_1)^2 + \frac{1}{2}(out_{O2} - \hat{Y}_2)^2 \quad (8)$$

The multiplicative constant ½ in each term is used to simplify differentiation during backpropagation. Since the overall result is scaled by a learning rate anyway, this constant does not negatively impact the training. Regardless, at this point, the feed forward iteration completes and backpropagation begins.

2. Backpropagation

As noted above, a goal of backpropagation is to use $\Delta$ (i.e., the total error determined based on a loss function) to update the weights so that they contribute less error in future feed forward iterations. As an example, consider the weight $w_5$. The goal involves determining how much the change in $w_5$ affects $\Delta$. This can be expressed as the partial derivative derivative $\frac{\partial \Delta}{\partial w_5}$.

Using the chain rule, this term can be expanded as:

$$\frac{\partial \Delta}{\partial w_5} = \frac{\partial \Delta}{\partial \text{out}_{O1}} \times \frac{\partial \text{out}_{O1}}{\partial \text{net}_{O1}} \times \frac{\partial \text{net}_{O1}}{\partial w_5} \qquad (9)$$

Thus, the effect on $\Delta$ of change to $w_5$ is equivalent to the product of (i) the effect on $\Delta$ of change to $\text{out}_{O1}$, (ii) the effect on $\text{out}_{O1}$ of change to $\text{net}_{O1}$, and (iii) the effect on $\text{net}_{O1}$ of change to $w_5$. Each of these multiplicative terms can be determined independently. Intuitively, this process can be thought of as isolating the impact of $w_5$ on $\text{net}_{O1}$, the impact of $\text{net}_{O1}$ on $\text{out}_{O1}$, and the impact of $\text{out}_{O1}$ on $\Delta$.

This process can be repeated for the other weights feeding into output layer 338. Note that no weights are updated until the updates to all weights have been determined at the end of backpropagation. Then, all weights are updated before the next feed forward iteration.

After updates to the remaining weights, $w_1$, $w_2$, $w_3$, and $w_4$ are calculated, backpropagation pass is continued to hidden layer 336. This process can be repeated for the other weights feeding into output layer 338. At this point, the backpropagation iteration is over, and all weights have been updated. ANN 330 may continue to be trained through subsequent feed forward and backpropagation iterations. In some instances, after over several feed forward and backpropagation iterations (e.g., thousands of iterations), the error can be reduced to produce results proximate the original desired results. At that point, the values of $Y_1$ and $Y_2$ will be close to the target values. As shown, by using a differentiable loss function, the total error of predictions output by ANN 330 compared to desired results can be determined and used to modify weights of ANN 330 accordingly.

In some cases, an equivalent amount of training can be accomplished with fewer iterations if the hyper parameters of the system (e.g., the biases $b_1$ and $b_2$ and the learning rate a) are adjusted. For instance, setting the learning rate closer to a particular value may result in the error rate being reduced more rapidly. Additionally, the biases can be updated as part of the learning process in a similar fashion to how the weights are updated.

Regardless, ANN 330 is just a simplified example. Arbitrarily complex ANNs can be developed with the number of nodes in each of the input and output layers tuned to address specific problems or goals. Further, more than one hidden layer can be used and any number of nodes can be in each hidden layer.

III. Convolutional Neural Networks

A convolutional neural network (CNN) is similar to an ANN, in that the CNN can consist of some number of layers of nodes, with weighted connections therebetween and possible per-layer biases. The weights and biases may be updated by way of feed forward and backpropagation procedures discussed above. A loss function may be used to compare output values of feed forward processing to desired output values.

On the other hand, CNNs are usually designed with the explicit assumption that the initial input values are derived from one or more images. In some embodiments, each color channel of each pixel in an image patch is a separate initial input value. Assuming three color channels per pixel (e.g., red, green, and blue), even a small 32×32 patch of pixels will result in 3072 incoming weights for each node in the first hidden layer. Clearly, using a naïve ANN for image processing could lead to a very large and complex model that would take long to train.

Instead, CNNs are designed to take advantage of the inherent structure that is found in almost all images. In particular, nodes in a CNN are only connected to a small number of nodes in the previous layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

Figure 4A:
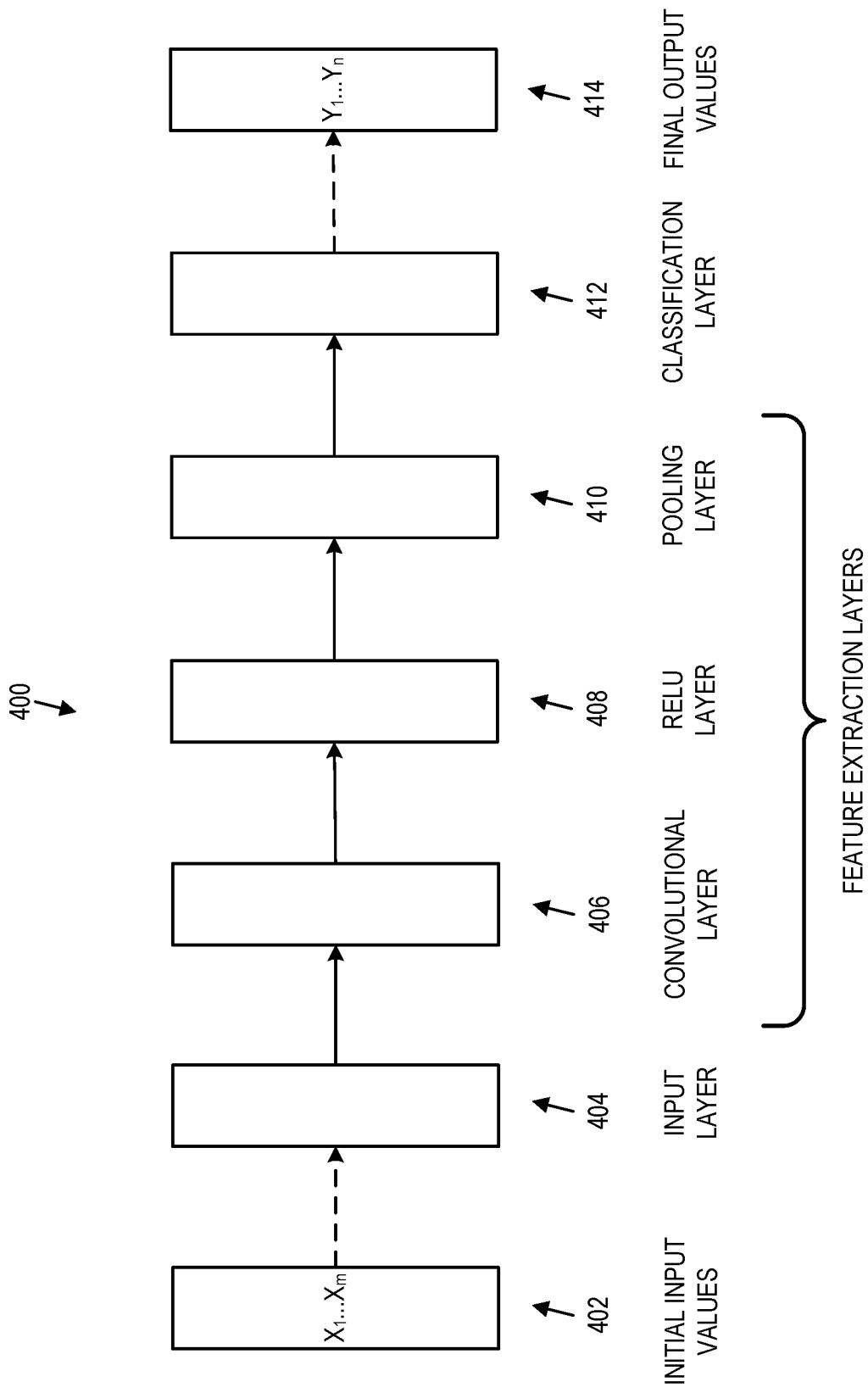
FIG. 4A depicts a convolution neural network (CNN) architecture, according to one or more example embodiments.

An example CNN 400 is shown in FIG. 4A. Initial input values 402, represented as pixels $X_1 \ldots X_m$, are provided to input layer 404. As discussed above, input layer 404 may have three dimensions based on the width, height, and number of color channels of pixels $X_1 \ldots X_m$. Input layer 404 provides values into one or more sets of feature extraction layers, each set containing an instance of convolutional layer 406, RELU layer 408, and pooling layer 410. The output of pooling layer 410 is provided to one or more classification layers 412. Final output values 414 may be arranged in a feature vector representing a concise characterization of initial input values 402.

Convolutional layer 406 may transform its input values by sliding one or more filters around the three-dimensional spatial arrangement of these input values. A filter is represented by biases applied to the nodes and the weights of the connections therebetween, and generally has a width and height less than that of the input values. The result for each filter may be a two-dimensional block of output values (referred to as a feature map) in which the width and height can have the same size as those of the input values, or one or more of these dimensions may have different size. The combination of each filter's output results in layers of feature maps in the depth dimension, in which each layer represents the output of one of the filters.

Applying the filter may involve calculating the dot-product sum between the entries in the filter and a two-dimensional depth slice of the input values. An example of this is shown in FIG. 4B. Matrix 420 represents input to a convolutional layer, and thus could be image data, for example. The convolution operation overlays filter 422 on matrix 420 to determine output 424. For instance, when filter 422 is positioned in the top left corner of matrix 420, and the dot-product sum for each entry is calculated, the result is 4. This is placed in the top left corner of output 424.

Turning back to FIG. 4A, a CNN learns filters during training such that these filters can eventually identify certain types of features at particular locations in the input values. As an example, convolutional layer 406 may include a filter that is eventually capable of detecting edges and/or colors in the image patch from which initial input values 402 were derived. A hyper-parameter called receptive field determines the number of connections between each node in convolutional layer 406 and input layer 404. This allows each node to focus on a subset of the input values.

RELU layer 408 applies an activation function to output provided by convolutional layer 406. In practice, it has been determined that the rectified linear unit (RELU) function, or a variation thereof, appears to provide strong results in CNNs. The RELU function is a simple thresholding function defined as $f(x) = \max(0, x)$. Thus, the output is 0 when x is negative, and x when x is non-negative. A smoothed, differentiable approximation to the RELU function is the softplus function. It is defined as $f(x)=\log(1+e^x)$. Nonetheless, other functions may be used in this layer.

Pooling layer 410 reduces the spatial size of the data by down-sampling each two-dimensional depth slice of output from RELU layer 408. One possible approach is to apply a 2×2 filter with a stride of 2 to each 2×2 block of the depth slices. This will reduce the width and height of each depth slice by a factor of 2, thus reducing the overall size of the data by 75%.

Classification layer 412 computes final output values 414 in the form of a feature vector. As an example, in a CNN trained to be an image classifier, each entry in the feature vector may encode a probability that the image patch contains a particular class of item (e.g., a human face, a cat, a beach, a tree, etc.).

In some embodiments, there are multiple sets of the feature extraction layers. Thus, an instance of pooling layer 410 may provide output to an instance of convolutional layer 406. Further, there may be multiple instances of convolutional layer 406 and RELU layer 408 for each instance of pooling layer 410.

CNN 400 represents a general structure that can be used in image processing. Convolutional layer 406 and classification layer 412 apply weights and biases similarly to layers in ANN 300, and these weights and biases may be updated during backpropagation so that CNN 400 can learn. On the other hand, RELU layer 408 and pooling layer 410 generally apply fixed operations and thus might not learn.

Not unlike an ANN, a CNN can include a different number of layers than is shown in the examples herein, and each of these layers may include a different number of nodes. Thus, CNN 400 is merely for illustrative purposes and should not be considered to limit the structure of a CNN.

IV. Speech Representations

A good speech representation may be high-performing on a diverse set of downstream tasks using simple models. In addition, the speech representation should be useful in transfer learning with small amounts of data for a new task.

In general, there are various approaches to building speech representations with some approaches using one or both of hand-crafted features and learned features. An example technique may involve using a data library to extract non-learned, signal processing-based features from audio data. The technique may represent the standard classical front-end for a wide range of non-semantic speech tasks. Previous attempts to learn a deep neural network (DNN)-based representation have leveraged various techniques, including supervised training, self-supervision, predictive coding, and multimodal coincidence.

The quality of a speech representation may depend on the representation's ability to accurately perform a diverse set of downstream tasks using simple models and how useful the representation is for transfer learning a new task with small amounts of data. Transfer learning is a machine learning method where a model developed for a task may be reused as the starting point for a model on a second task. In some instances, pre-trained models are used as the training point on particular tasks (e.g., computer vision, natural language processing). As such, transfer learning can enable an optimization that allows rapid progress or improved performance when modeling an additional task.

A model can be used for on-device learning. For example, the model can perform on-device learning on a smartphone, wearable computing device, or another type of mobile device. Transfer learning with a small amount of data is particularly relevant for enabling model personalization based on the user of a device. For instance, a representation and transfer learning may be used to enable user-specific emotion recognition or speaker identification. The size of the model can limit the model's use. In particular, the model may represent an algorithm which learns features from input data to produce labels which may be continuous or categorical and utilize mathematical functions to map the features to their labels. In some examples, production of a model may involve collection of suitable data, preprocessing the data for training the model, training the model, evaluating the model, and hosting the model for production.

In addition, transfer learning from a larger data set can also be useful in the medical domain, where data cannot be shared as easily due to patient privacy. A generally-useful representation for speech could benefit medical speech researchers who might not have access to large amounts of medical audio data.

There are three standard approaches to adapting a representation to multiple, potentially heterogeneous, downstream tasks. A first approach involves training a task-specific linear classifier on the embedding produced by a pre-trained network while the parameters of the network are kept frozen. The embedding may be a relatively low-dimensional space into which the network can translate high-dimensional vectors. For example, the embedding may be a low-dimensional, learned continuous vector representation of discrete variables (e.g., speech).

A neural network embedding is useful because the embedding can reduce the dimensionality of categorical variables and meaningfully represent categories in the transformed space. A neural network embedding can be used to find nearest neighbors in the embedding space, which enables a system to make determinations based on similarities. The neural network embedding can also serve as input to a machine learning model for a supervised task.

Another approach that can be used to adapt a representation to downstream tasks involves performing a fully-fine tuning process, in which a pre-trained network is used as a starting point for an end-to-end training process. The end-to-end training process may involve jointly training all parameters. The network can learn a mapping from input data to output signals. Generally, a fine-tuned representation can match or outperform the performances of fully supervised models trained on some downstream tasks, especially when the amount of labeled data utilized for the end-to-end training process is relatively small.

Yet another approach can involve multi-task learning, which might be preferred when the downstream tasks are all applied on the same input set. Multi-task learning may involve solving multiple learning tasks at the same time while exploiting commonalities and differences across tasks. Multi-task learning can be used to increase learning efficiency and prediction accuracy for the task-specific models when compared to training the models separately. Multi-task learning can involve one or more techniques, such as task grouping and overlap, exploiting unrelated tasks, transfer of knowledge, and group online adaptive learning.

Non-semantic aspects of a speech signal (e.g. speaker identity, language, and emotional state) generally change more slowly than the phonetic and lexical aspects used to explicitly convey meaning. Therefore, a high quality representation (e.g., speech representation 608) for non-semantic downstream tasks can be considerably more stable in time than what is required for automatic speech recognition (ASR) applications. However, at sufficiently long time scales (e.g. across days or environments), the elements of a user talking and the context are likely to change rather dramatically. Thus, rough temporal proximity of audio clips can be expected to be weakly predictive of geometric proximity of latent factors that characterize non-semantic content. To take advantage of this intuition, temporal proximity may be used as a self-supervised signal. However, instead of grouping audio segments closer than T seconds, segments drawn from the same audio sample are clustered.

To further illustrate, consider a large, unlabeled speech collection represented as a sequence of spectrogram context windows as follows:

$$X = x_1 x_2 \ldots x_N \quad [1]$$

where each $x_i \in \mathbb{R}^{F \times T}$. In some instances, a goal is to learn a map $g: \mathbb{R}^{F \times T} \to \mathbb{R}^d$ from spectrogram context windows to d-dimensional space such that the following is true:

$$\|g(x_i) - g(x_j)\| \leq \|g(x_i) - g(x_k)\| \text{ when } |i-j| \leq |i-k| \quad [2]$$

The desired relationship shown above in equation 2 can be expressed as a learning objective using triplet loss-based metric learning as follows. From X, a large collection of example triplets of the form $z = (x_i, x_j, x_k)$ (the so-called anchor, positive, and negative examples), where $|i-j| \leq \tau$ and $|i-k| > \tau$ for some suitably chosen time scale $\tau$. The loss incurred by each triplet can then be given as follows:

$$\mathcal{L}(z) = \Sigma_{i=1}^{N} [\|g(x_i) - g(x_j)\|_2^2 - \|g(x_i) - g(x_k)\|_2^2 + \delta]_+ \quad [3]$$

where $\|\cdot\|_2$ is the $\mathcal{L}_2$ norm, $[\cdot]_+$ is standard hinge lose, and $\delta$ is a nonnegative margin hyper-parameter.

The triplet loss objective can be amendable to stochastic gradient descent optimization, but progress can quickly plateau if the triplet examples are not particularly difficult to satisfy. Therefore, some embodiments may employ a within-batch semi-hard negative mining technique, which can involve applying the current state of g to all triplets in a batch and reassigning negatives to anchor-positive pairs that will continue to incur loss penalty (i.e., negatives that are "hard"). Choosing the hardest negative reassignment, however, can be subject to label noise. Thus, the semi-hard strategy may further involve selecting the closet negative to the anchor that remains further than the positive.

In the present case, the temporal proximity-based supervisory signal can be extremely weak with respect to particular downstream applications. The signal may express only an expected property of non-semantic speech representations, which can be far from strictly true in a large non-curated speech collection and a fixed $\tau$. Therefore, to enable success in learning something generally useful, some examples involve using a very large data scale to boost the strength of the supervisory signal. For example, some datasets may include thousands of hours of speech from voices in nearly as many distinct natural contexts. These clips may be short (e.g., 10 seconds), which can enable setting $\tau$ to cover whole clips. This sampling strategy does not produce particularly difficult negatives, which can make the semi-hard mining technique critical for successful optimization.

A system may take as input log mel spectrogram context windows with F=64 mel bands and T=96 frames representing 0.96 seconds of input audio (STFT computed with 25 ms windows with step 10 ms) and employing the Resnetish variant of the standard ResNet-50 architecture followed by a d=512 dimensional embedding layer. Each embedding may be length normalized before calculation of the triplet loss, which can transform squared Euclidean distance into cosine distance. Notably, batch normalization is not used due to the biased sampling involved in triplet construction. Thus, the Adam optimizer with learning rate of $10^{-5}$ may be used.

Finally, note that the average pooling operation present in the ResNet architecture before the final fully connected layer can destroy the sub-second temporal structure of our learned representation, which may be suboptimal for some downstream tasks. Therefore, some examples may involve representations defined by earlier convolutional blocks after the full Resnetish embedding model has been fully trained. These internal layers can produce 3-tensor outputs (time×frequency×channels) that may be flattened.

As shown, learning a high quality representation on a large benchmark and then fine-tuning the representation for a downstream task can be effective in the speech domain. In particular, clearly defined benchmarks (e.g., NOSS benchmark) can enable efficient comparison between representations of speech.

V. Example Systems

Figure 5:
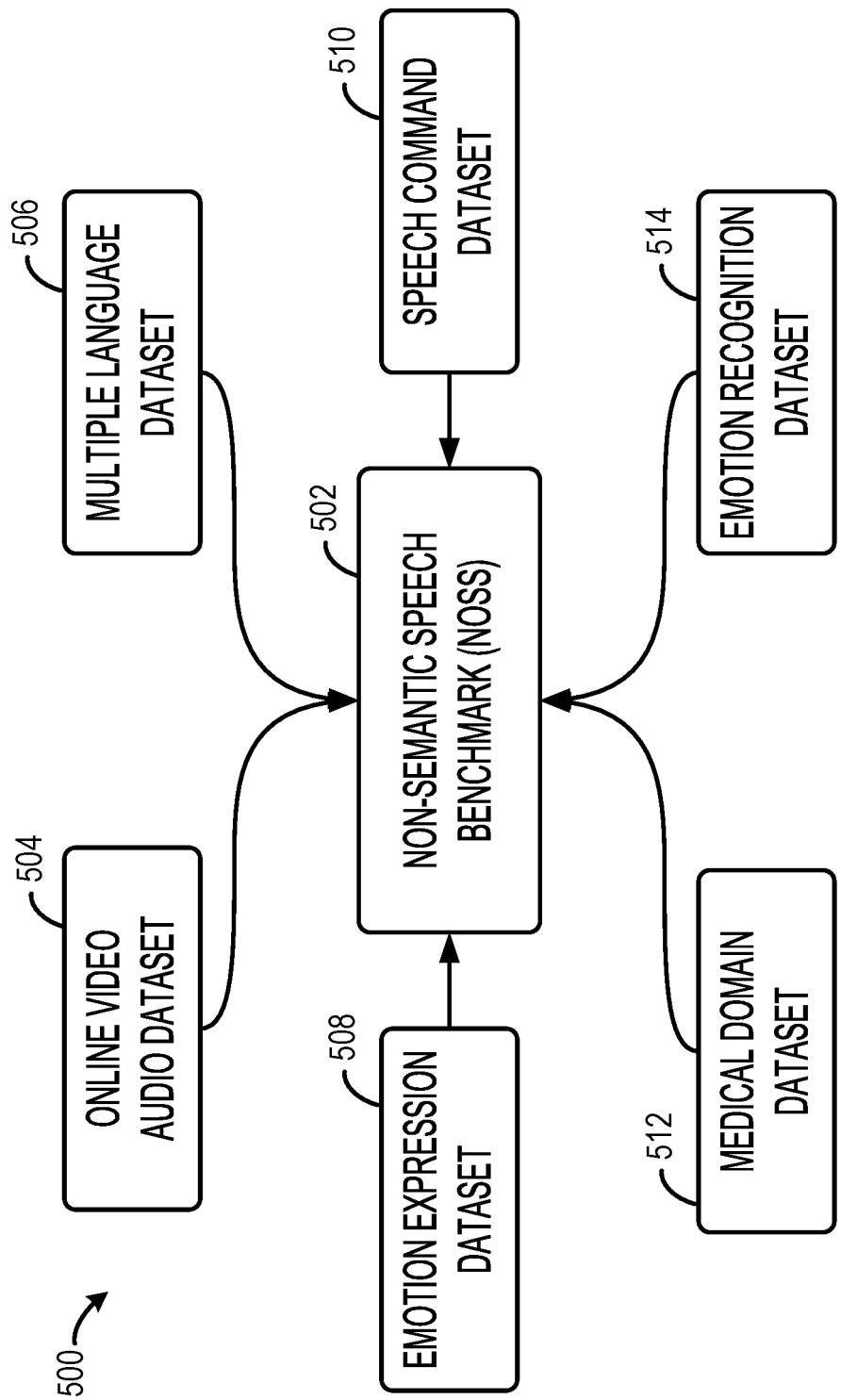
FIG. 5 depicts a system for implementing a non-semantic speech (NOSS) benchmark, according to one or more example embodiments.

FIG. 5 depicts a system for implementing a non-semantic speech benchmark, according to one or more example embodiments. As shown in FIG. 5, system 500 shows non-semantic speech benchmark (NOSS) 502 and a variety of datasets used to develop NOSS 502. The datasets include online video audio dataset 504, multiple language dataset 506, emotion expression dataset 508, speech command dataset 510, medical domain dataset 512, and emotion recognition dataset 514. In other embodiments, system 500 may include more or fewer datasets to develop NOSS benchmark 502. In addition, the types of datasets can differ within examples.

The performance of speech representations can be evaluated using NOSS 502. In particular, NOSS 502 may be used to standardize the assessment of non-semantic speech representations. A computing device (e.g., system 500) may develop NOSS benchmark 502 to enable assessing different properties of a speech signal. As such, system 500 may use various data sets that can vary in size and depth to create NOSS benchmark 502. In addition, the computing device may distribute NOSS 502 to other computing devices for subsequent use. For example, NOSS 502 may be distributed via wireless communication between computing devices.

Because personalization and on-device training is increasingly important, some example embodiments may further include using intra-speaker tasks for one or more of the datasets when applicable. Intra-speaker tasks can be an important addition because these tasks can also test task adaption for small amounts of data. As a result, speech representations can be evaluated on intra-speaker tasks in addition to speaker identity by using NOSS 502.

Online video audio dataset 504 is a speaker recognition dataset developed based on online videos. The quantity of videos used to develop the online video audio dataset 504 can vary within examples and may include a large number of utterances (e.g., 150,000 utterances) obtained from various speakers (e.g., 1,000 speakers). The types of videos used to extract data to develop online video audio dataset 504 can vary. The videos can correspond to different types of activities and involve one or more speakers within each video. By utilizing data from various videos, online video audio dataset 504 may include a large amount of diverse speech data that can be used by system 500 during the development of NOSS benchmark 502.

Multiple language dataset 506 is a collection of audio clips that include speakers speaking in a variety of languages. System 500 may utilize multiple language dataset 506 to create a language classification task for the NOSS benchmark 502. The language classification task for the NOSS benchmark 502 may include utterances from various languages accessed via multiple language dataset 506, such as English, Spanish, French, German, Russian, and Italian. In some examples, the utterances within multiple language dataset 506 may be received from numerous speakers speaking various utterances (e.g., 176,000 utterances from approximately 14,000 speakers).

Emotion expression dataset 508 includes facial and vocal emotional expressions in sentences spoken in a range of basic emotional states (e.g., happy, sad, anger, fear, disgust, and neutral). The quantity of expressions can vary and may include a wide array of expressions to enhance the development of NOSS benchmark 502. As an example, emotion expression dataset 508 may include 7,000 clips obtained from 100 different actors.

Speech command dataset 510 may include limited semantic information that system 500 may use to further develop NOS benchmark 502. In one example, speech command dataset 510 may include semantic information that can test for 12 different classes, 10 of them are full words, one of them is silence, and the last is "unknown" which is a collection of 26 different words. As such, speech command dataset 510 may enable testing a model's understanding of a more rapidly changing phenomenon than other tasks in NOSS benchmark 502 (i.e., it may have the smallest average duration at 1 second). In some examples, speech command dataset 510 may include approximately 100,000 utterances in total recorded by approximately 2,500 different speakers.

In some embodiments, system 500 may also use medical domain dataset 512 during development of NOSS benchmark 502. Medical domain dataset 512 may be created based on vocal inputs provided by a quantity of people diagnosed with a medical condition (e.g., Alzheimer Disease) and a quantity of people that do not have the medical condition. For example, both groups may have read some text or provide other vocal inputs during the creation of medical domain dataset 512. The process enables medical domain dataset 512 to represent how speakers with a particular medical condition may speak or sound when compared to speakers without the medical condition. System 500 may use medical domain dataset 512 to train NOSS benchmark 502 to be able to analyze classifications between the different groups used to generate medical domain dataset 512. This task shows the difficulties faced when trying to train models for the medical domain, namely very small amounts of data and some non-standard speech. Other medical data sets may be used.

System 500 may also develop NOSS benchmark 502 to include an emotion recognition task learned via emotion recognition dataset 514. Emotion recognition dataset 514 may be developed via speakers reading sentences while applying different emotions during each read. For instance, a speaker may read the same sentence multiple times while applying a different emotion during each read similar to a voice actor. Example emotions may include, but are not limited to, anger, disgust, fear, happiness, neutral, sadness, and surprise. As such, emotion recognition dataset 514 may include a quantity of utterance spoken by each speaker (e.g., 120 utterances) using various sentences (e.g., 480 sentences) in total.

Figure 6:
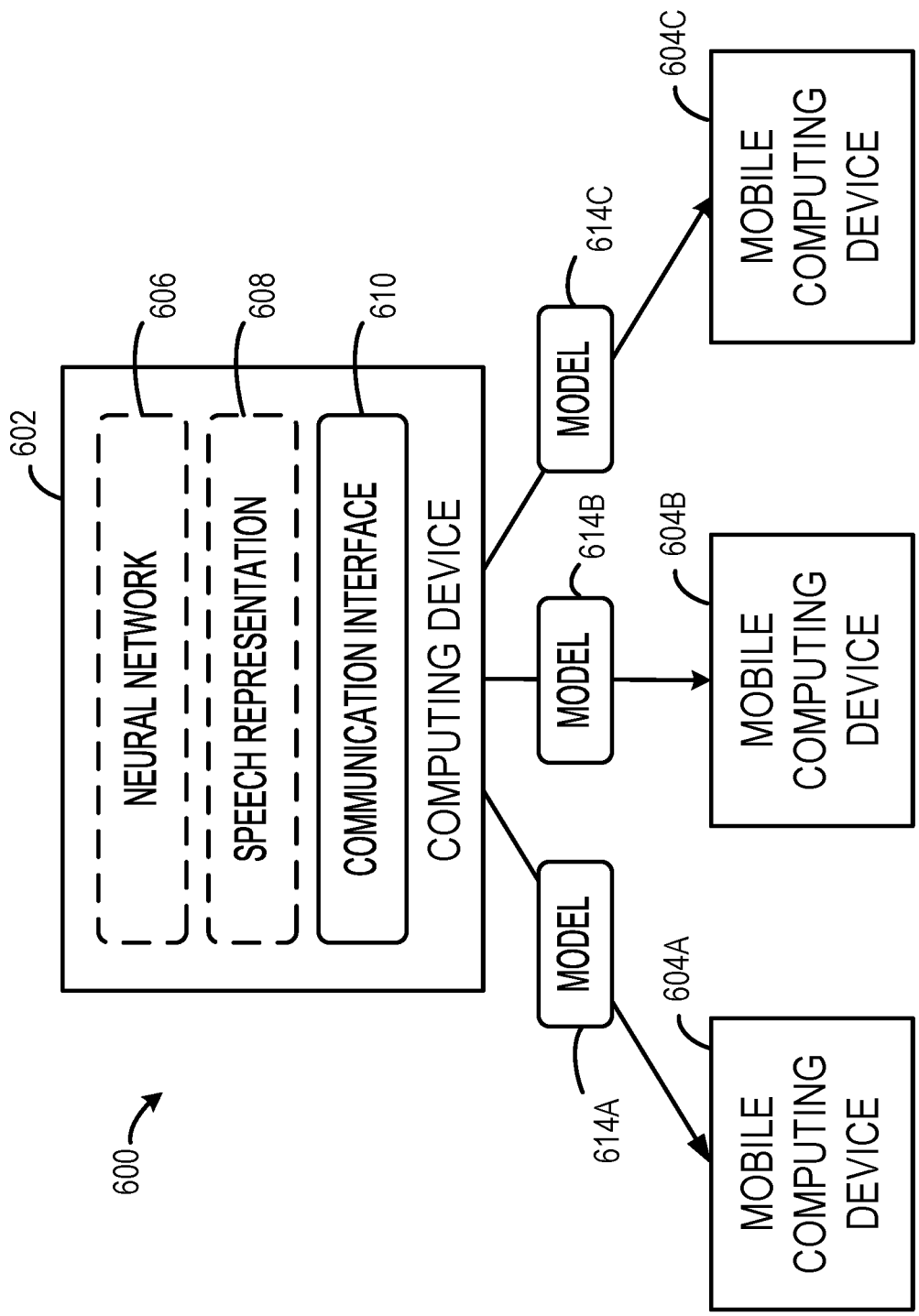
FIG. 6 illustrates a distribution of the NOSS benchmark between computing devices, according to one or more example embodiments.

FIG. 6 illustrates a system involving a computing device distributing models to mobile computing devices, according to one or more example embodiments. System 600 includes computing device 602 shown providing models 614A, 614B, 614C to mobile computing devices 604A, 604B, 604C, respectively. In the embodiment shown in FIG. 6, computing device 602 includes neural network 606, speech representation 608, and communication interface 610. Computing device 602 may include other elements or components in other examples.

Computing device 602 may represent one or more computing devices configured to perform operations described herein. For example, computing device 602 may be implemented as computing device 100 shown in FIG. 1. As such, computing device 602 may develop and provide models 614A-614C to mobile computing devices 604A-604C.

In the embodiment shown in FIG. 6, computing device 602 may generate the models 614A-614C based on speech representation 608. For example, computing device 602 may obtain audio data that includes clips of speakers in various contexts. Computing device 602 may train neural network 606 to learn speech representation 608 based on the speech portion of the audio data. Thus, the size of the audio dataset (and amount of speaker clips) can impact the quality of speech representation 608.

In some examples, speech representation 608 may be a non-semantic speech representation learned by neural network 606 trained on speech clips within audio data. Speech representation 608 can be evaluated using NOSS and subsequently fine-tuned to increase performance on one or more downstream tasks, such as emotion recognition, speaker identity, or medical condition identification. In addition, speech representations 608 can be configured for task adaptation, which can increase personalization of mobile computing devices 604A-604C. As such, computing device 602 may generate models 614A-614C based on speech representation 608 and subsequently provide (e.g., wirelessly transmit) models 614A-614C to mobile computing devices 604A-604C using communication interface 610. For example, each mobile computing device may receive a model transmitted as a software update. Mobile computing devices 604A-604C may use models 614A-614C to perform operations based on a user's vocal inputs.

VI. Example Method

Figure 7:
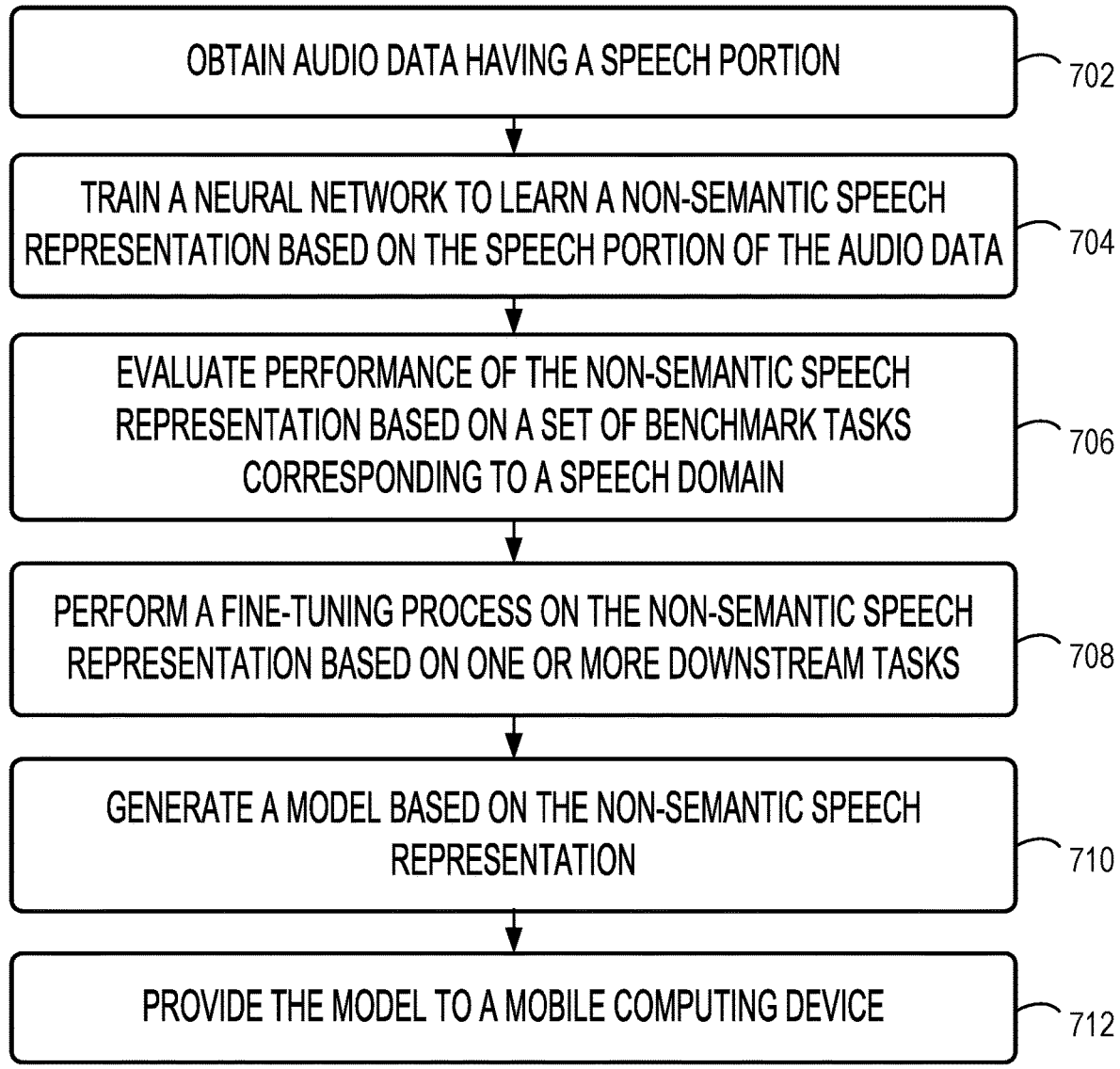
FIG. 7 is a flow chart of a method, according to one or more example embodiments.

FIG. 7 is a flow chart of a method 700, according to one or more example embodiments. Method 700 may include one or more operations, functions, or actions as illustrated by one or more of blocks 702, 704, 706, 708, 710, and 712. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, a tangible storage device, or other article of manufacture, for example. Furthermore, for method 700 and other processes and methods disclosed herein, each block in FIG. 7 may represent circuitry that is wired to perform the specific logical functions in the process.

At block 702, method 700 involves obtaining audio data having a speech portion. The computing system may receive the audio data from a remote computing system via wireless communication.

In some examples, the computing system may obtain the audio data such that the speech portion includes speech clips from at least a threshold number of speakers. For instance, the audio data may include thousands of hours of audio (e.g., 5,000 hours) with speech clips from thousands or even hundreds of thousands of voices. The duration of the audio clips that make up the audio data can vary. For example, the audio data may include audio clips that average ten seconds in duration.

At block 704, method 700 involves training a neural network to learn a non-semantic speech representation based on the speech portion of the audio data. The computing system may train a pre-trained neural network using an unsupervised learning process.

In some examples, training the neural network to learn the non-semantic speech representation based on the speech portion of the audio data involves training a pre-trained neural network using an unsupervised learning process. In other examples, training the neural network to learn the non-semantic speech representation may involve training the neural network to learn the non-semantic speech representation based on an unsupervised triplet-loss objective.

At block 706, method 700 involves evaluating performance of the non-semantic speech representation based on a set of benchmark tasks corresponding to a speech domain. The set of benchmark tasks may be configured to indicate a general usefulness of the non-semantic speech representation for the speech domain.

In some examples, the computing system may evaluate performance of the non-semantic speech representation for speaker identification based on a first benchmark task corresponding to an online video audio dataset. The computing system may also evaluate performance of the non-semantic speech representation for language identification based on a second benchmark task corresponding to a multiple language dataset.

In addition, the computing system may also evaluate performance of the non-semantic speech representation for speech command based on a third benchmark task corresponding to a speech command dataset. The computing system may further evaluate performance of the non-semantic speech representation for emotion recognition based on a fourth benchmark task corresponding to an audio visual emotion expression dataset.

In some examples, the computing system may also evaluate performance of the non-semantic speech representation for a medical condition based on a fifth benchmark task corresponding to a medical domain dataset. In particular, the medical domain dataset may include utterances from a first set of speakers and a second set of speakers (e.g., with only the first set of speakers having the medical condition).

At block 708, method 700 involves performing, by the computing system, a fine-tuning process on the non-semantic speech representation based on one or more downstream tasks. The computing system, for example, may perform a fine-tuning process using an optimizer having a plurality of learning rates. In addition, the computing system may perform an intra-speaker fine-tuning process based on at least one downstream task.

In some examples, the computing system may determine that the performance of the non-semantic speech representation satisfies a performance threshold and perform the fine-tuning process on the non-semantic speech representation responsive to determining that the performance of the non-semantic speech representation satisfies the performance threshold.

At block 710, method 700 involves generating a model based on the non-semantic representation. The computing device may generate the model responsive to performing the fine-tuning process on the non-semantic speech representation.

In some examples, the computing system may distill the non-semantic speech representation into the model such that the model comprises a reduced size that is further trainable at the mobile computing device. The reduced size may enable the model to be further customized based on speech of a particular speaker, such as the mobile computing device's user.

At block 712, method 700 involves providing the model to a mobile computing device. The model may be configured to operate locally on the mobile computing device. In some examples, providing the model may involve transmitting the model for operation at the mobile computing device via a software update using a network.

Figure 8:
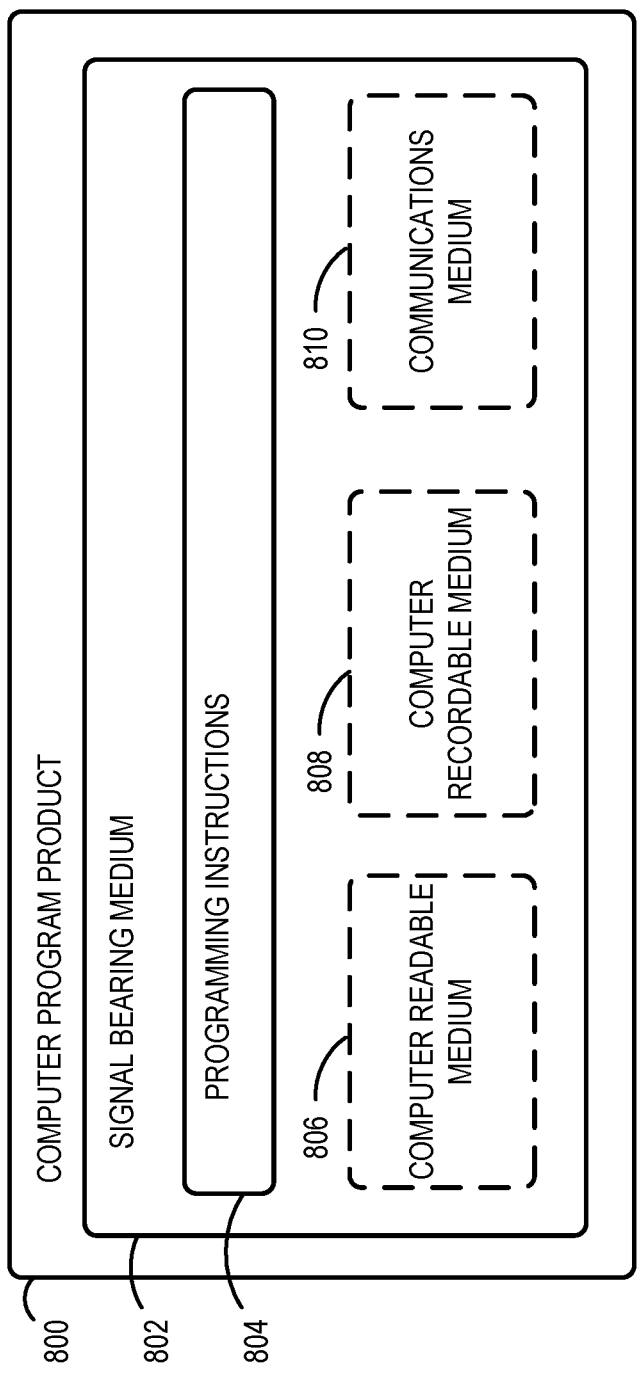
FIG. 8 is a schematic illustrating a conceptual partial view of a computer program for executing a computer process on a computing system, arranged according to at least some embodiments presented herein.

FIG. 8 is a schematic illustrating a conceptual partial view of a computer program for executing a computer process on a computing system, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 100 of FIG. 1 may be configured to provide various operations, functions, or actions in response to the programming instructions 804 conveyed to the computer system 100 by one or more of the computer readable medium 806, the computer recordable medium 808, and/or the communications medium 810.

The non-transitory computer readable medium could also be distributed among multiple data storage elements, which could be remotely located from each other. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   obtaining, by a computing system, audio data having a speech portion;
   training, by the computing system, a neural network to learn a non-semantic speech representation based on the speech portion of the audio data;
   evaluating performance of the non-semantic speech representation based on a set of benchmark tasks corresponding to a speech domain;
   performing, using a set of downstream tasks, a comparison between the non-semantic speech representation and one or more existing feature-based and learned representations to determine where the non-semantic speech representation requires improvement through a fine-tuning process;
   performing, by the computing system, the fine-tuning process on the non-semantic speech representation to improve performance of the non-semantic speech on one or more downstream tasks;
   generating, by the computing system, a model based on the non-semantic speech representation; and
   providing, by the computing system, the model to a mobile computing device, wherein the model is configured to operate and train locally on the mobile computing device using vocal inputs having non-semantic speech from a user such that the model enables the mobile computing device to perform operations differently based on a speaker identification, a medical condition identification, or an emotion of the user.

2. The method of claim 1, wherein obtaining the audio data having the speech portion comprises:
   receiving, from a remote computing system, the audio data via wireless communication.

3. The method of claim 1, wherein obtaining the audio data having the speech portion comprises:
   obtaining the audio data such that the speech portion includes speech clips from at least a threshold number of speakers.

4. The method of claim 1, wherein training the neural network to learn the non-semantic speech representation based on the speech portion of the audio data comprises:
   training a pre-trained neural network using an unsupervised learning process.

5. The method of claim 1, wherein training the neural network to learn the non-semantic speech representation based on the speech portion of the audio data comprises:
   training the neural network to learn the non-semantic speech representation based on an unsupervised triplet-loss objective.

6. The method of claim 1, wherein evaluating performance of the non-semantic speech representation based on the set of benchmark tasks corresponding to the speech domain further comprises:
   evaluating performance of the non-semantic speech representation for speaker identification based on a first benchmark task corresponding to an online video audio dataset; and
   evaluating performance of the non-semantic speech representation for language identification based on a second benchmark task corresponding to a multiple language dataset.

7. The method of claim 6, wherein evaluating performance of the non-semantic speech representation based on the set of benchmark tasks corresponding to the speech domain further comprises:
   evaluating performance of the non-semantic speech representation for speech command based on a third benchmark task corresponding to a speech command dataset; and
   evaluating performance of the non-semantic speech representation for emotion recognition based on a fourth benchmark task corresponding to an audio visual emotion expression dataset.

8. The method of claim 7, wherein evaluating performance of the non-semantic speech representation based on the set of benchmark tasks corresponding to the speech domain further comprises:
   evaluating performance of the non-semantic speech representation for a medical condition based on a fifth benchmark task corresponding to a medical domain dataset, wherein the medical domain dataset includes utterances from a first set of speakers and a second speakers, and wherein only the first set of speakers have the medical condition.

9. The method of claim 7, wherein evaluating performance of the non-semantic speech representation based on the set of benchmark tasks corresponding to the speech domain further comprises:
   determining that the performance of the non-semantic speech representation satisfies a performance threshold; and
   wherein performing the fine-tuning process on the non-semantic speech representation based on one or more downstream tasks comprises:
   performing the fine-tuning process on the non-semantic speech representation responsive to determining that the performance of the non-semantic speech representation satisfies the performance threshold.

10. The method of claim 1, wherein performing the fine-tuning process on the non-semantic speech representation based on one or more downstream tasks comprises:
    performing the fine-tuning process using an optimizer having a plurality of learning rates.

11. The method of claim 1, wherein performing the fine-tuning process on the non-semantic speech representation based on one or more downstream tasks comprises:
    performing an intra-speaker fine-tuning process based on at least one downstream task.

12. The method of claim 1, wherein generating the model based on the non-semantic speech representation comprises:
distilling the non-semantic speech representation into the model such that the model comprises a reduced size that is trainable at the mobile computing device.

13. The method of claim 1, wherein generating the model based on the non-semantic speech representation comprises:
generating the model responsive to performing the fine-tuning process on the non-semantic speech representation.

14. The method of claim 1, wherein providing the model to the mobile computing device comprises:
transmitting the model for operation at the mobile computing device via a software update using a network.

15. A system comprising:
a mobile computing device; and
a computing system configured to:
obtain audio data having a speech portion;
train a neural network to learn a non-semantic speech representation based on the speech portion of the audio data;
evaluate performance of the non-semantic speech representation based on a set of benchmark tasks corresponding to a speech domain;
perform, using a set of downstream tasks, a comparison between the non-semantic speech representation and one or more existing feature-based and learned representations to determine where the non-semantic speech representation requires improvement through a fine-tuning process;
perform the fine-tuning process on the non-semantic speech representation to improve performance of the non-semantic speech on one or more downstream tasks;
generate a model based on the non-semantic speech representation; and
provide the model to the mobile computing device, wherein the model is configured to operate and train locally on the mobile computing device using vocal inputs having non-semantic speech from a user such that the model enables the mobile computing device to perform operations differently based on a speaker identification, a medical condition identification, or an emotion of the user.

16. The system of claim 15, wherein the set of benchmark tasks is configured to indicate a general usefulness of the non-semantic speech representation for the speech domain.

17. The system of claim 15, wherein the computing system is further configured to:
train the neural network to learn the non-semantic speech representation based on an unsupervised triplet-loss objective.

18. The system of claim 15, wherein the computing system is further configured to:
evaluate performance of the non-semantic speech representation for speaker identification based on a first benchmark task corresponding to an online video audio dataset; and
evaluate performance of the non-semantic speech representation for language identification based on a second benchmark task corresponding to a multiple language dataset.

19. The system of claim 18, wherein the computing system is further configured to:
evaluate performance of the non-semantic speech representation for speech command based on a third benchmark task corresponding to a speech command dataset; and
evaluate performance of the non-semantic speech representation for emotion recognition based on a fourth benchmark task corresponding to an audio visual emotion expression dataset.

20. A non-transitory computer-readable medium configured to store instructions, that when executed by a computing system comprising one or more processors, causes the computing system to perform operations comprising:
obtaining audio data having a speech portion;
training a neural network to learn a non-semantic speech representation based on the speech portion of the audio data;
evaluating performance of the non-semantic speech representation based on a set of benchmark tasks corresponding to a speech domain;
performing, using a set of downstream tasks, a comparison between the non-semantic speech representation and one or more existing feature-based and learned representations to determine where the non-semantic speech representation requires improvement through a fine-tuning process;
performing the fine-tuning process on the non-semantic speech representation to improve performance of the non-semantic speech on one or more downstream tasks;
generating a model based on the non-semantic speech representation; and
providing the model to a mobile computing device, wherein the model is configured to operate and train locally on the mobile computing device using vocal inputs having non-semantic speech from a user such that the model enables the mobile computing device to perform operations differently based on a speaker identification, a medical condition identification, or an emotion of the user.

* * * * *